July 10, 1962

H. R. KEEPERS 3,043,151

VARIABLE PITCH SHEAVE

Filed Feb. 19, 1960

INVENTOR.
HARRY R. KEEPERS,

BY *Allen & Allen*

ATTORNEYS.

United States Patent Office 3,043,151
Patented July 10, 1962

3,043,151
VARIABLE PITCH SHEAVE
Harry R. Keepers, Maysville, Ky., assignor to Browning Manufacturing Company, Maysville, Ky., a corporation of Kentucky
Filed Feb. 19, 1960, Ser. No. 9,747
1 Claim. (Cl. 74—230.17)

This invention relates to sheaves and more particularly to a multiple belt sheave having an adjustable or variable pitch diameter.

A principal object of the instant invention is the provision of a simplified variable pitch sheave incorporating improved locking means for positively securing the parts in adjusted position. Heretofore sheaves of this general character, such as the adjustable sheave set forth in Otto et al. Patent 2,262,197, have been adjusted by means of a single adjustment nut arranged to move axially along the hub of the sheave, the adjustment nut being secured in place by a set screw adapted to frictionally engage the periphery of the adjusting nut. There is, however, an inherent looseness in the threaded connection between the adjusting nut and the hub due to normal manufacturing tolerances which adversely affects the adjustment of the pitch of the sheave as well as produces faster wear of the parts with resultant shortening of their useful life.

In accordance with the instant invention, I have provided a simplified sheave construction in which the movable or adjustable parts of the sheave are secured in the desired position of adjustment by means of a pair of locking rings which coact to lock the adjustable parts of the sheave in the desired position of use, the coacting locking rings acting to compensate for any inherent looseness in their threaded connection to the hub and at the same time providing a tight locking action.

The foregoing together with other objects of the invention which will appear hereinafter or which will be apparent to the skilled worker in the art upon reading these specifications, I accomplish by that construction and arrangement of parts of which I shall now describe in an exemplary embodiment.

Reference is now made to accompanying drawings wherein.

In accordance with the invention, a multiple belt adjustable sheave is formed by providing a hub 1 having a keyway 2 adapted to receive a key (not shown) by means of which the hub is fixed against rotation relative to the shaft on which it is mounted. At one end the hub terminates in an intergral end flange or disc 3 which, as shown, may be provided with a threaded bore 4 for a set screw effective to prevent axial movement of the hub along the shaft on which it is mounted.

Figure 2:
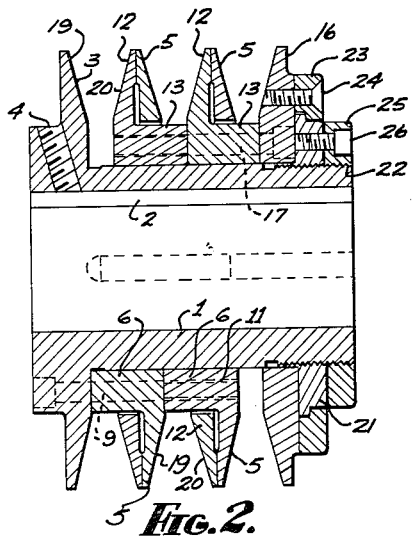
FIGURE 2 is a vertical sectional view taken along the lines 2—2 of FIGURE 1.
Figure 1:
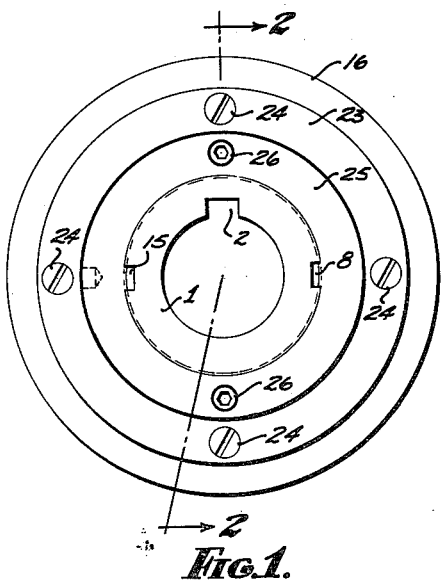
FIGURE 1 is an end view of an adjustable sheave constructed in accordance with the invention.

A plurality of intermediate fixed discs 5 are mounted on the hub 1, the discs being provided with mounting and spacing flanges 6 having keyways 7 by means of which the discs may be keyed to the hub, as by means of complementary keyway 8. The flanges 6 of each fixed disc 5 are arranged to abut an adjacent fixed disc, thereby positioning the discs in uniform spaced relation, the discs being secured together in abutting relationship by means of bolts 9 which extend through the end flange 3 and aligned openings 10 in the flanges 6, the openings in the disc furtherest removed from the end flange 3 being threaded, as indicated at 11 in FIGURE 2, to receive the threaded ends of the bolt 9.

Figure 3:
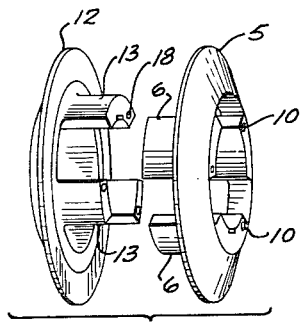
FIGURE 3 is an exploded perspective view illustrating sheave discs of opposite hand.
Figure 4:
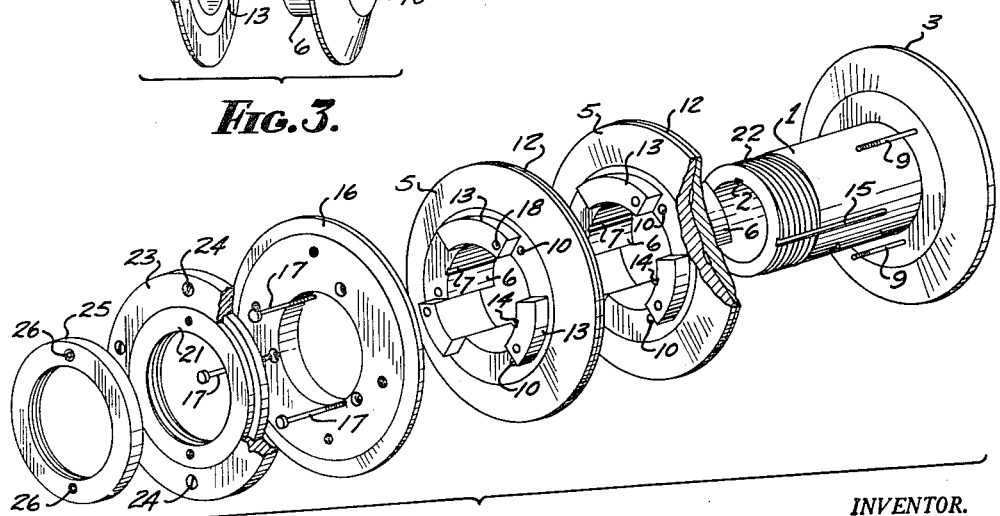
FIGURE 4 is an exploded perspective view with parts broken away illustrating the components of an adjustable sheave constructed in accordance with the instant invention.

The hub 1 also mounts a series of complementary discs 12 arranged to move axially along the hub, the discs 12 having spacing flanges 13 arranged to mate with the flanges 6 of the disc 5 in interdigitating relationship, as will be clearly apparent from FIGURES 3 and 4. As in the case of flanges 6, the flanges 13 may be provided with keyways 14 by means of which the discs 12 may be fixed against rotation relative to the hub 1, the hub being provided with a coacting keyway 15.

The movable discs 12 are adapted to be secured to a movable end disc 16 by means of bolts 17 which pass through apertures 18 in the flanges 13, the threaded free ends of the bolts being engaged by threads in the apertures of the disc 12 furtherest removed from the movable end disc 16.

As will be apparent from the drawings, the movable discs are interspaced between the fixed disc and adjacent moving and fixed discs define between them a pair of complementary conical belt receiving surfaces 19 and 20.

The movable discs are adapted to be moved axially of the hub as a unit by means of inner adjustment ring 21 which is threaded on the threaded portion 22 of the hub, the adjusting ring being held in abutting relation with the movable end discs 16 by means of the retaining ring 23 secured to the movable end discs 16 by means of screws 24. Rotation of the adjustment ring 21 will result in axial movement of the adjustable discs 12 and movable end disc 16, thereby causing them to jointly move toward or away from the fixed discs with which they coact, thereby altering the pitch diameter of the sheave in accordance with their direction of movement.

Coacting with the inner adjustment ring 21 is an outer locking ring 25 which is also in threaded engagement with the threads 22 on the hub 1, the outer locking ring being secured to the inner adjustment ring by means of capscrews 26.

A positive locking action is obtained by means of the capscrews 26 which, when tightened, serve to effectively draw the inner adjustment ring 21 and outer locking ring toward each other, thereby effecting a wedging or clamping action against the threads 22 on the hub. That is, when the two rings are drawn toward each other, any inherent looseness in the mating threads is overcome by the lateral forces exerted by the capscrews which force the walls of the mating threads into tight engagement. Yet the pitch diameter of the sheave can be readily changed simply by backing-off the capscrews by approximately one turn—which is sufficient to free the threads from normal turning movement, whereupon a spanner wrench can be applied to the outer locking ring and the two rings jointly rotated, thereby moving the movable discs axially as required to adjust the pitch of the sheave. When the desired adjusted pitch is obtained, it is then only necessary to retighten the capscrews to again lock the rings in position.

As should now be apparent, the instant invention provides a relatively simple and yet effective multiple belt adjustable sheave which is simple and easy to adjust and which, when adjusted, can be securely and positively locked in the adjusted position.

Having thus described the invention in an exemplary embodiment, and with the understanding that modification may be made in it without departing from its spirit and purpose, what I desire to secure and protect by Letters Patent is:

In an adjustable sheave wherein a hub mounts a plurality of fixed and slidable discs in alternate relation, and wherein the slidable discs are connected together for joint axial movement relative to said fixed discs, the improvement which comprises an adjustment ring in threaded engagement with said hub, a retaining ring operatively connecting said adjustment ring to one of said slidable discs, whereby rotation of said adjustment ring will effect axial movement of said sliding discs, a locking ring in threaded engagement with said hub immediately adjacent to said adjustment ring, capscrews connecting said adjustment ring and said locking ring for joint rotary movement, said capscrews additionally acting, when tightened, to draw said two rings toward each other so as to effect wedging and locking action between their threads and the threads on said hub.

References Cited in the file of this patent

UNITED STATES PATENTS

| | | |
|---|---|---|
| 171,898 | Wiles | Jan. 4, 1876 |
| 222,220 | Wynkoop | Dec. 2, 1879 |
| 2,262,197 | Otto | Nov. 11, 1941 |
| 2,400,294 | Firth et al. | May 14, 1946 |
| 2,610,515 | Williams | Sept. 16, 1952 |
| 2,855,787 | Kumro et al. | Oct. 14, 1958 |
| 2,890,592 | Keepers | June 16, 1959 |

FOREIGN PATENTS

| | | |
|---|---|---|
| 931,021 | Germany | July 28, 1955 |